April 21, 1959  A. F. KARLIN  2,882,740
ACTUATOR
Filed Sept. 7, 1954  2 Sheets-Sheet 1

INVENTOR.
ANTHONY F. KARLIN
BY
ATTORNEY

April 21, 1959

A. F. KARLIN 2,882,740

ACTUATOR

Filed Sept. 7, 1954

INVENTOR.
ANTHONY F. KARLIN
BY
ATTORNEY

United States Patent Office 2,882,740
Patented Apr. 21, 1959

2,882,740

ACTUATOR

Anthony F. Karlin, Maple Heights, Ohio, assignor to Cleveland Pneumatic Industries, Inc., a corporation of Ohio Application September 7, 1954, Serial No. 454,528

2 Claims. (Cl. 74—424.8)

This invention relates generally to motor driven actuators and more particularly to an actuator wherein means are provided to protect the motor against overloading.

An actuator according to this invention is particularly adapted for use in aircraft installations where it is desirable to reduce the weight to a minimum while still providing desirable force characteristics.

It is an important object of this invention to provide an actuator wherein the power source may continue to operate after the stroke of the actuator is completed.

It is another object of this invention to provide an actuator with means for protecting the motor or other power source by automatically reducing the load on the power source after the actuator has operated.

It is another object of this invention to provide an actuator wherein means are provided limiting the maximum amount of energy delivered by the power source.

It is another object of this invention to provide an actuator wherein the inertia of the mass of one of the elements is utilized to control the maximum amount of energy delivered by the power source.

Further objects and advantages will appear from the following description and drawings, wherein.

Figure 1:
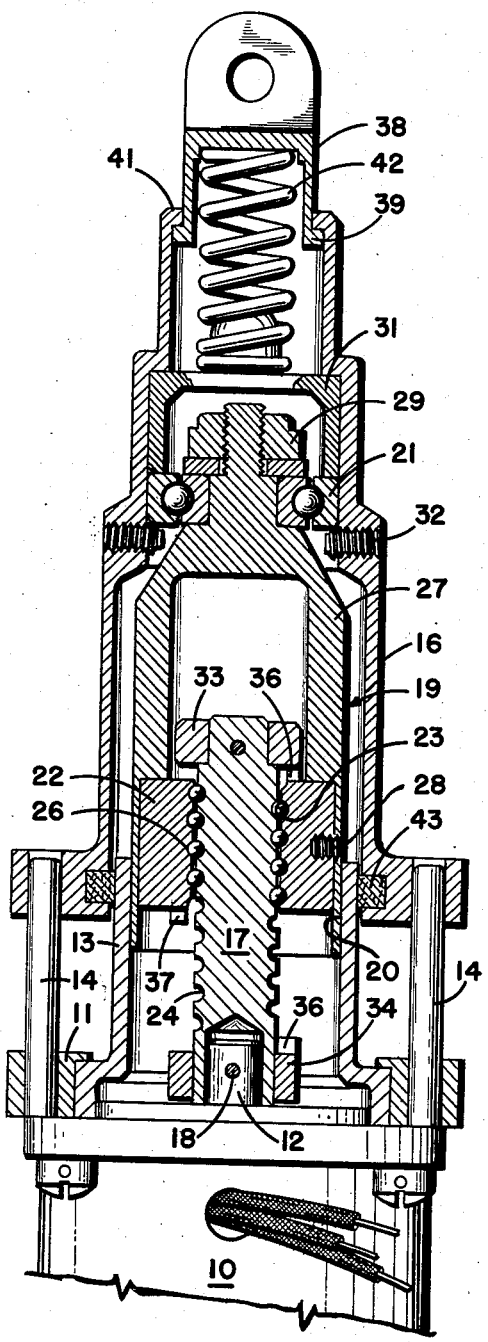
Figure 1 is a side elevation in longitudinal section showing an actuator according to this invention in the extended position.

An actuator according to this invention includes a rotary power source, preferably an electric motor connected to a ball screw mechanism which converts the rotary motion of the power source into the linear motion of the actuator. Referring to the drawings, a motor 10 is mounted on a frame member 11 and provided with a drive shaft 12. Also mounted on the frame or base 11 is a cylindrical housing member 13 which projects coaxially with the drive shaft 12, and two or more guide pins 14 which provide means for restraining a movable frame member 16 against rotation while permitting free axial motion thereof.

A ball screw assembly connected between the drive shaft 12 and the movable frame member 16 includes a screw 17 attached to the drive shaft 12 by a pin 18 and a nut assembly 19 journaled on the movable frame or housing member 16 by a thrust ball bearing 21 and a sleeve type bearing surface at 20. The nut assembly 19 comprises a nut 22 formed with internal helical groove 23 which cooperate with external helical groove 24 on the screw 17 to define a helical ball channel filled with balls 26 and a nut casing 27 which is fastened to the nut 22 by a screw fastener 28. A fastener 29 is used to mount the inner race of the bearing 21 to the nut casing and the outer race of the bearing 21 is secured in the movable frame member 16 by a thrust member 31 on one side and a screw fastener 32 on the other side. This provides a ball screw mounting wherein the screw 17 is directly connected for rotation with the motor 10 and the nut assembly 19 is mounted in the movable frame member 16 in such a manner that it is rotationally free and axially fixed relative thereto.

When the actuator is operated the motor 10 initiates rotation of the screw 17. At this time the nut, although free to rotate, resists rotation due to the mass inertia of the nut assembly 19 so relative rotation between the nut and the screw results. This relative rotation causes the nut to move axially of the screw toward one or the other of the extreme positions depending on the direction of the rotation of the screw. If for some reason the load on the actuator is excessive, the nut will be restrained against axial motion with the result that the nut assembly 19 will accelerate at the same rate as the screw 17 until they reach the equilibrium rotational speed of the motor, at which time the power required from the motor approaches zero, the only power consumption being the power necessary to overcome the windage and friction in the bearings. In practice, the maximum amount of energy ever required from the motor 10 is calculated to be below its possible maximum output, thereby protecting the motor against overload and its deleterious effect.

Mounted at either end of the screw 17 are bottoming elements 33 and 34 which are rigidly attached to the screw. These bottoming elements 33 and 34 are each provided with an axially extending substantially radial face or lug 36 which is proportioned to engage an axially extending projection 37 formed on the ends of the nut 22. When the nut 22 reaches either extreme end relative to the screw 17, one of the projections 37 engages the cooperating radial face 36 and mechanically prevents further relative rotation between the nut and the screw. At this time the nut is accelerated until it is rotating at the same speed as the screw so the motor can continue to run but the power requirement, after equilibrium is reached, is reduced to only the energy required to overcome friction and windage.

Mounted in the end of the movable frame member 16 is a connecting member 38 which is free to move axially relative to the movable frame member toward the motor 10 but which is prevented from moving axially in the other direction beyond the position shown in Figure 1 by the interlocking flanges 39 and 41. A spring 42 extends between the thrust member 31 and the connecting member 38 biasing the connecting member outwardly relative to the movable frame member 16 so that the flanges 39 and 41 are normally engaged. This structure is used to provide a flexible link which limits the amount of thrust in one direction that is delivered by the actuator while providing a solid mechanical connection for thrust in the other direction. A seal 43 is provided between the movable frame member 16 and the cylindrical housing member 13 to prevent dirt or similar materials from entering the actuator.

Figure 2:
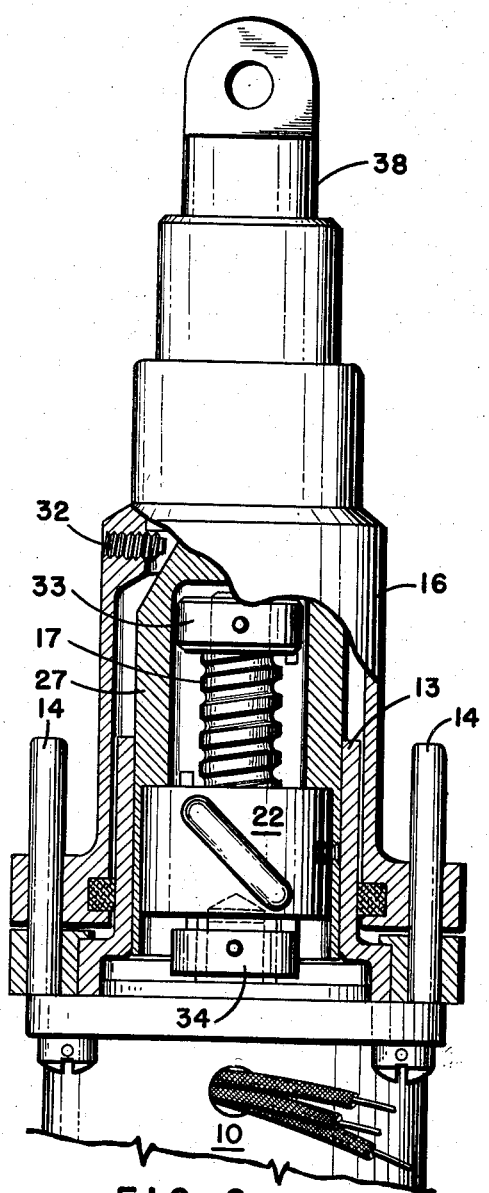
Figure 2 is a view similar to Figure 1 showing the position the elements assume when the actuator is in the retracted position.
Figure 3:
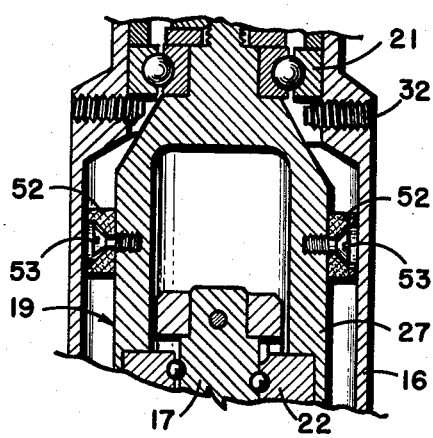
Figure 3 is a fragmentary longitudinal section of a modification of this invention wherein friction brake means are used to augment the operation of the actuator.

In the modification shown in Figure 3 all of the structural elements perform the same functions as in the embodiment shown in Figures 1 and 2. However, in the modification friction brake members 52 are mounted on the nut casing 27 by screws 53. Preferably, the friction members should be proportioned to lightly engage the inner surface of the movable frame member 16 when the nut casing is not rotating as well as being loosely mounted on the screws 53 so that the force of engagement increases due to centrifugal forces as the velocity of rotation increases. This structure serves the dual function of limiting the terminal rotational velocity of the elements and also permitting the use of a lighter nut for given loads since the friction augments the mass inertia in preventing the nut from rotating at the same velocity as the screw.

In operation the starting of the motor 10 rotationally accelerates the screw 17 which in turn tends to cause the nut assembly 19 to rotationally accelerate. However, since the rate of rotational acceleration, if the nut 22 accelerated with the screw 17, would be large when compared to the maximum corresponding axial acceleration of the nut, the mass inertia of the nut assembly 19 resists this rotational acceleration and prevents the nut assembly from turning at the same speed as the screw. This results in relative rotation between the nut and screw which causes relative axial motion therebetween. Again since the rate of rotation between the nut and the screw is large in relationship to the corresponding axial motion, a small mass inertia reaction to rotational acceleration will overcome a relatively large axial force. Therefore, the nut assembly 19 will move axially relative to the screw 17 until the nut assembly reaches one of the bottoming elements 33 or 34 at which time one of the projecting portions 37 will engage a radial face 36 and further relative rotation between the screw and nut is impossible. If the motor continues to operate, the screw 17 and the nut assembly 19 rotate as a unit until an equilibrium speed of rotation is reached. It is apparent that even though the actuator has operated through a complete stroke, the motor can continue to operate and the load on the motor will be relieved. It is also apparent that as long as the nut and screw continue to accelerate, the inertia of the nut assembly will tend to hold the nut adjacent to one or the other of the bottoming elements 33 or 34. If it is desired to arrange the actuator so that the nut assembly remains at the end of the screw reached after the initial axial movement when the motor is shut off, it is merely necessary to arrange the friction in the bearings 20 and 21 and of the friction material 52, if used, so that the nut assembly 19 tends to slow down faster than the screw and motor. Under these conditions the nut assembly will remain in the terminal position when the motor is shut off. If such structure is utilized, a reversible motor should be provided so that the actuator may be operated in both directions.

In some cases it may be desirable to arrange the actuator so that it automatically provides a cycle of operation wherein the nut assembly moves from an initial position adjacent to one of the bottoming elements 33 or 34 to the end of the screw and back to the initial position. If such operation is desired the friction of the nut assembly should be arranged to be less than the friction of the motor 10 and the screw 17. If this structure is utilized, the motor 10 and screw 17 will slow down faster than the nut assembly 19 after the motor is shut off and this will cause the nut assembly to return to its initial position automatically.

Figures 4, 5:
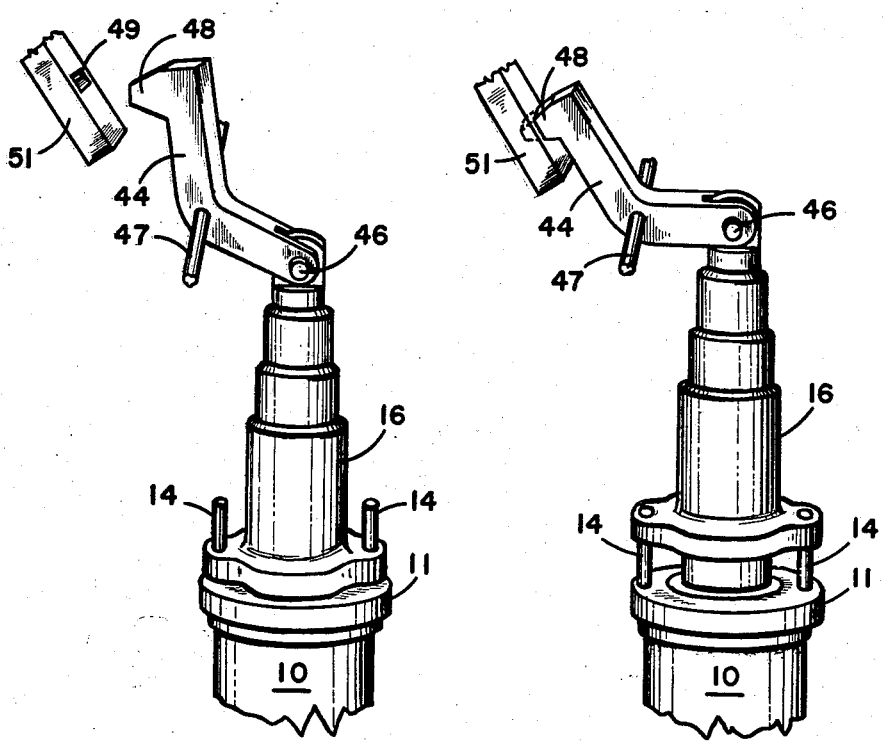
Figure 4 is a fragmentary perspective of an actuator according to this invention shown as it would be used to operate a latch type lock; and, Figure 5 is a view similar to Figure 4 showing the position of the elements after the lock is released by the actuator.

Referring to Figures 4 and 5, the actuator is connected to a latch member 44 by a pin 46. This latch member 44 is pivoted on the pivot 47 and provided with a hook 48 which is proportioned to fit into a recess 49 in the member to be locked 51. When the actuator is operated to release the member 51, the connected member 38 is pulled downward and the latch member 44 is rotated about the pivot 47 until the hook 48 is free of engagement with the member 51. It is apparent that the maximum amount of force necessary in such installations occurs at the beginning of movement of the latch member 44. It is also apparent that since the inertia of the nut assembly 19 is the important factor preventing the nut from turning with the screw, the maximum thrust of the actuator is developed at the beginning of the stroke when the inertia begins to act.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An actuator comprising a base, first and second co-operating screw elements, a housing connected to an axial load axially movable relative to said base between two spaced positions, first means axially fixing said first element to said base while permitting relative rotation therebetween, second means axially fixing said second element to said housing while permitting substantially frictionless relative rotation therebetween, power means rotationally accelerating said first means, said second element having a mass inertia providing substantially the sole resistance to acceleration thereof with said first element and moving said housing the entire distance between said spaced positions.

2. An actuator comprising a base, first and second co-operating screw elements, a housing connected to an axial load axially movable relative to said base between two spaced positions, first means axially fixing said first element to said base while permitting relative rotation therebetween, second means axially fixing said second element to said housing while permitting substantially frictionless relative rotation therebetween, power means rotationally accelerating said first means, second element having a mass inertia providing substantially the sole resistance to acceleration thereof with said first element and moving said housing the entire distance between said spaced positions, said power means accelerating said first element during the entire movement of said load.

References Cited in the file of this patent

UNITED STATES PATENTS

| | | |
|---|---|---|
| 888,619 | Kelly | May 26, 1908 |
| 2,682,780 | Pickles | July 6, 1954 |

FOREIGN PATENTS

| | | |
|---|---|---|
| 645,635 | Great Britain | Nov. 8, 1950 |